United States Patent Office 3,465,042
Patented Sept. 2, 1969

3,465,042
SUBSTITUTED 2-NITROBENZOPHENONES
Goetz E. Hardtmann, Madison, and Hans Ott, Convent Station, N.J., assignors to Sandoz, Inc., Hanover, N.J.
No Drawing. Original application June 11, 1965, Ser. No. 463,378. Divided and this application July 26, 1967, Ser. No. 665,655
Int. Cl. C07c 79/36
U.S. Cl. 260—591                                    4 Claims

ABSTRACT OF THE DISCLOSURE

This invention discloses 2′-methyl-2-nitrobenzophenones and 2′-bromomethyl-2-nitrobenzophenones useful as successive intermediates in the preparation of 9,13b-dihydro-5H-isoindolo[2,1-d][1,4]benzodiazepin-6(7H)-ones which are useful as sedatives, transquilizers and anticonvulsants.

This application is a division of copending application Ser. No. 463,378, filed June 11, 1965 now U.S. Patent 3,375,246.

The present invention is directed to pharmaceutically acceptable isoindolobenzodiazepinones, particularly those of the formula

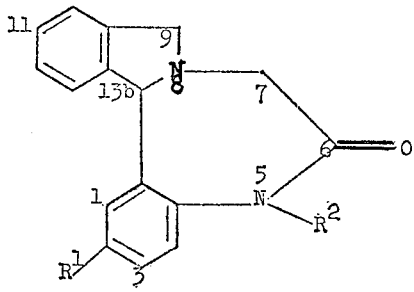

wherein $R^1$ is either a hydrogen atom (—H); a chlorine atom (—Cl); a fluorine atom (—F); or a bromine atom (—Br);

$R^2$ is either a hydrogen atom (—H) or $R^3$; and $R^3$ is either lower alkyl, e.g., methyl, ethyl, propyl, isopropyl and butyl; lower alkenyl having a saturated α-carbon atom, e.g., allyl; lower alkinyl having a saturated α-carbon atom, e.g., propargyl; or di(lower) alkylamino(lower)alkyl having an alkylene bridge of at least two carbon atoms, e.g., β-dimethylaminoethyl and γ-(N-ethyl-N-methyl)aminopropyl;

and acid addition salts thereof.

Among the pharmaceutically acceptable acid addition salts are salts of organic acids, e.g., tartaric acid; inorganic acids, e.g., hydrochloric acid, hydrobromic acid and sulfuric acid; monobasic acids, e.g., an alkanesulfonic acid, such as methanesulfonic acid ($H_3C$—$SO_3H$); dibasic acids, e.g., succinic acid; tribasic acids, e.g., phosphoric acid and citric acid; saturated acids, e.g., acetic acid; ethylenically unsaturated acids, e.g., maleic acid and fumaric acid; and aromatic acids, e.g., salicylic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acids are preferred for this purpose.

Each compound I has an asymmetric carbon atom (13b) and thus exists as a racemate or in an optically active form. Each of the optical antipodes (enantiomers) is within the scope of this invention. Resolution of racemates into optical antipodes is effected according to procedures well-known to the art-skilled and does not, per se, constitute the essence of the instant invention.

Compounds I are prepared according to the following reaction scheme:

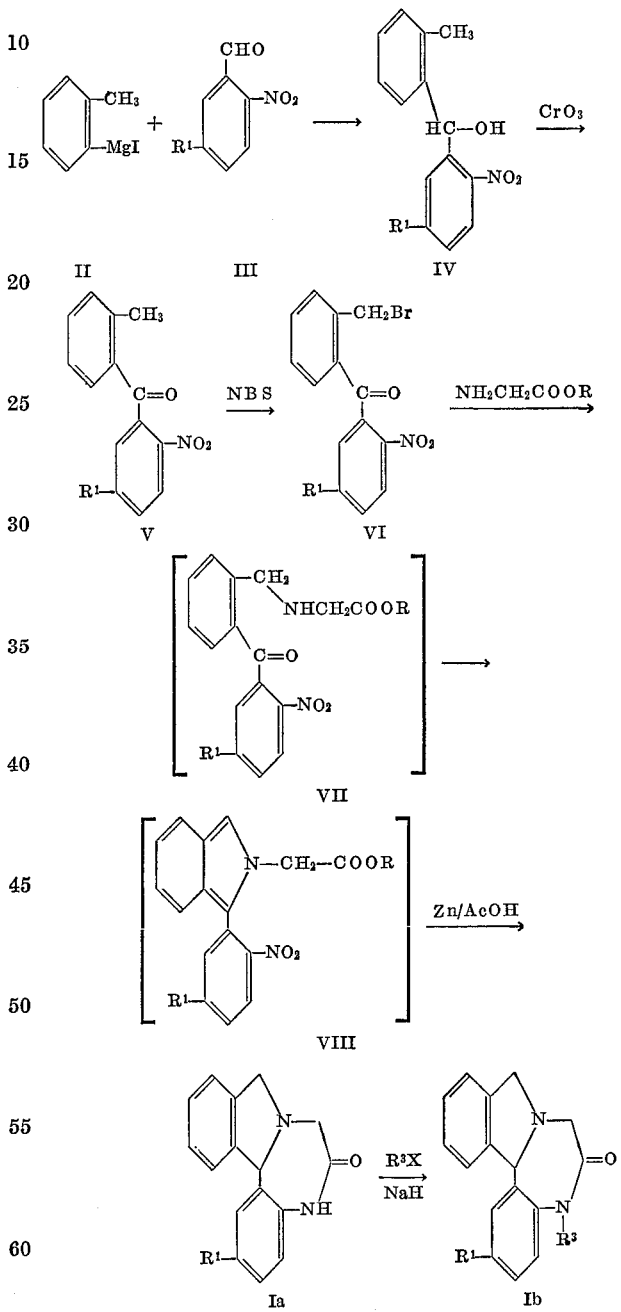

wherein

R is either methyl or ethyl;

X is either a chlorine atom (—Cl), a bromine atom (—Br) or an iodine atom (—I); and each of $R^1$, $R^2$ and $R^3$ has its above-ascribed meaning.

The Grignard reaction between the o-tolyl-magnesium iodide II and o-nitrobenzaldehyde III is carried out in dry toluene. The dry toluene can be replaced by another inert solvent, such as benzene, tetrahydrofuran and diethylether.

Oxidation of IV with chromic acid in acetic acids leads, in high yield, to the benzophenone V which, on bromination with N-bromosuccinimide (NBS) is an inert solvent, such as carbon tetrachloride, yields the bromomethyl-benzophenone VI.

On reaction of VI with glycine ester at 0° C. under nitrogen atmosphere, a dark blue product (VIII) forms which cannot be isolated in pure form, but is directly reduced with zinc and acetic acid to the highly crystalline isoindolobenzodiazepine Ia. The hydrogen atom at $N_5$ of Ia is readily replaced by $R^3$ according to well-known procedures.

Acid addition salts of compounds I are prepared from free bases Ia and Ib according to standard well-known procedures.

Compounds I and their pharmaceutically acceptable acid addition salts are useful as sedatives, sedative/hypnotics, tranquilizers, anticonvulsants and antidepressants. They are administered either orally or parenterally in standard dosage forms, e.g. tablets and capsules, in daily doses of from 30 to 200 milligrams.

Each of the pharmaceutically active compounds of this invention may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well known in the art, employing the necessary amounts of conventional granulating liquids, e.g., alcohol SD-30 and purified water. An exemplary tabletting formulation for the instant active compounds is:

| | Parts |
|---|---|
| Title compound of Example 6 | 50 |
| Tragacanth | 2 |
| Lactose | 39.5 |
| Corn starch | 5 |
| Talcum | 3 |
| Magnesium stearate | 0.5 |
| Alcohol SD-30 } q.s. | |
| Purified water } | |

The following examples illustrate the invention, all temperatures being in degrees centigrade, parts and percentages being by weight unless otherwise specified, and the relationship between parts by weight and parts by volume being the same as that between the kilogram and the liter.

Example 1.—5-chloro-2'-methyl-2-nitro-benzhydrol

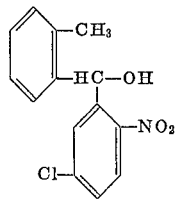

Add a solution of 26 parts of o-tolyl magnesium iodide in 300 parts by volume of diethylether to the solution of 15 parts of 5-chloro-2-nitro-benzaldehyde in 200 parts by volume of dry toluene at −65°. Stir for 3 hours at this temperature, then raise the temperature to −10° and add slowly 20 parts by volume of saturated ammonium chloride solution. Acidify the aqueous phase with dilute hydrochloric acid. Separate the organic phase and extract the aqueous phase twice with benzene. Wash all the organic layers several times with water. Collect the thus obtained organic phase, dry over sodium sulfate and evaporate the solvents in vacuo. Crystallize from diethylether to obtain 11 parts of the title compound, M.P. 130° to 132°.

Replacing the 5-chloro-2-nitro-benzaldehyde with an equivalent of either 2-nitrobenzaldehyde, 5-bromo-2-nitro-benzaldehyde or 5-fluoro-2-nitro-benzaldehyde results in the preparation, in similar manner, of the corresponding compound IV.

Example 2.—5-chloro-2'-methyl-2-nitro-benzophenone

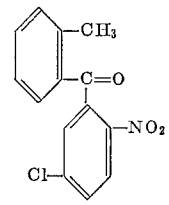

Add a suspension of 6.5 parts of chromium trioxide in 40 parts by volume of glacial acetic acid over a period of thirty minutes to a boiling solution of 9.5 parts of 5-chloro-2'-methyl-2-nitro-benzhydrol in 40 parts by volume of glacial acetic acid. Continue boiling for another fifteen minutes. After cooling add the thus-obtained reaction mixture to 500 parts by volume of water whereby 9 parts of the title compound precipitate out in yellow prisms, M.P. 115° to 116°.

Replacing the 5 - chloro-2'-methyl-2-nitro-benzhydrol with an equivalent of either 2-methyl-2'-nitro-benzhydrol, 5-bromo-2'-methyl-2-nitro-benzhydrol or 5-fluoro-2'-methyl-2-nitro-benzhydrol results in the preparation, in similar manner, of the corresponding compound V.

Example 3.—2'-bromomethyl-5-chloro-2-nitro-benzophenone

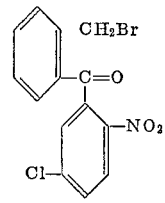

Reflux a mixture of 3.6 parts of 5-chloro-2'-methyl-2-nitro-benzophenone, 2.5 parts of N-bromosuccinimide and 0.1 part of dibenzoyl-peroxide in 35 parts by volume of carbontetrachloride for 3 hours. Dilute the thus-obtained mixture with methylene chloride; wash the organic phase twice with water; dry same over sodium sulfate and evaporate the solvents in vacuo. Crystallize the residue from methylene chloride/diethylether to obtain 2.2 parts of the title compound as yellow prisms, M.P. 137° to 139°.

Replacing the 5-chloro-2'-methyl-2-nitro-benzophenone with an equivalent of either 2-methyl-2'-nitro-benzophenone, 5-bromo-2'-methyl-2-nitro-benzophenone or 5-fluoro-2'-methyl-2-nitro-benzophenone results in the preparation, in similar manner, of the corresponding compound VI.

Example 4.—2-carbethoxymethyl-1-(5-chloro-2-nitrophenyl)-isoindole

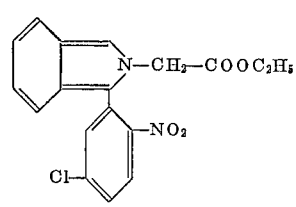

Dissolve 1.8 parts of 2'-bromomethyl-5-chloro-2-nitro-benzophenone and 1 part of glycine ethyl ester in 40 parts by volume of chloroform and 500 parts by volume of ethanol. Stir this mixture for 48 hours in a nitrogen atmosphere at a temperature of 0° to 5°. Evaporate the solvent in vacuo and use the thus-obtained crude reaction product in Example 5.

Replacing the 2'-bromomethyl-5-chloro-2-nitro-benzophenone with an equivalent of either 2-bromomethyl-2'-nitro-benzophenone, 2'-bromomethyl - 5 - bromo-2-nitro-benzophenone or 2'-bromomethyl-5-fluoro-2-nitro-benzophenone results in the preparation, in similar manner of the corresponding compound VII. Replacing the glycine ethyl ester with an equivalent of glycine methyl ester results in the preparation, in similar manner, of 2-carbomethoxymethyl-1-(5-chloro-2-nitro-phenyl)-isoindole.

Example 5.—2-chloro-9,13b-dihydro-5H-isoindolo[2,1-d] [1,4]benzodiazepin-6(7H)-one

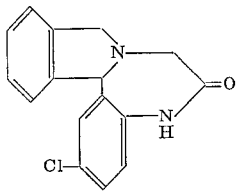

Dissolve the crude reaction product from Example 4 in 100 parts by volume of acetic acid; add thereto 4 parts of zinc dust and stir the thus-obtained mixture for 3 hours at room temperature (20°). Filter off the unreacted zinc; evaporate the filtrate in vacuo; dissolve the resulting residue in chloroform and wash the organic phase with 2 N sodium carbonate solution and with water. Concentrate the dried organic phase to 10 parts by volume whereby 0.6 part of the title compound crystallizes, M.P. 258° to 260°.

Replacing the crude mixture from Example 4 with an equivalent of 2-carbomethoxymethyl-1-(5-chloro-2-nitro-phenyl)-isoindole results in the preparation, in similar manner, of the title compound. Replacing the crude mixture from Example 4 with an equivalent of either 2-carbethoxymethyl - 1 - (2-nitro-phenyl)-isoindole, 2-carbethoxymethyl-1-(5-bromo-2-nitro-phenyl)-isoindole or 2-carbethoxymethyl - 1 - (5-fluoro-2-nitro-phenyl)-isoindole results in the preparation, in similar manner, of the corresponding compound Ia.

Example 6.—2-chloro-5-methyl-9,13b-dihydro-5H-isoindolo[2,1-d][1,4]benzodiazepin-6(7H)-one

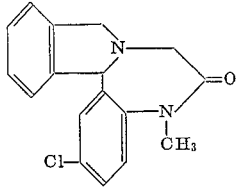

Dissolve 6 parts of 2-chloro-9,13b-dihydro-5H-isoindolo[2,1-d][1,4]benzodiazepin-6(7H)-one in 200 parts by volume of absolute dimethylformamide and add at 60° 1,3 parts of sodium hydride (56% in mineral oil). Heat to 70° and add after 30 minutes 4.3 parts of methyl iodide. Stir for one hour at 50° to 60° and then add water. Evaporate the reaction mixture to dryness in vacuo, dissolve the residue in 300 parts by volume of methylene chloride. Wash this solution with water, dry the organic phase over sodium sulfate and evaporate the solvent in vacuo. Dissolve the resulting residue in diethyl-ether/methylene chloride, and saturate the filtered solution with dry hydrogen chloride gas, whereby 3 parts of the title compound precipitate out as its hydrochloride, M.P. 263° to 268°. The base is freed by standard procedures and melts at 165° to 172°.

Replacing the methyl iodide by an equivalent of either ethyl iodide, propyl iodide, allyl bromide, propargyl bromide, 2-chloro-1-dimethylaminoethane, 3-chloro-1-(N-methyl-N-ethyl)aminopropane, 1 - chloro-2-diethylamino-propane or 3-chloro-1-dimethylaminopropane results in the preparation, in similar manner, of the corresponding compound Ib. Replacing the title compound of Example 5 with an equivalent of either 9,13b-dihydro-5H-isoindolo [2,1-d][1,4]benzodiazepin-6(7H)-one, 2-bromo-9,13b-dihydro - 5H - isoindolo[2,1-d][1,4]benzodiazepin-6(7H)-one or 2 - fluoro-9,13b-dihydro-5H-isoindolo[2,1-d][1,4] benzodiazepin-6(7H)-one results in the preparation, in similar manner, of the coresponding compound Ib.

The invention and its advantages are readily understood from the foregoing description. Various changes may be made in the intermediates and in the final products (including the pharmaceutically acceptable acid addition salts) without departing from the spirit and scope of the invention or sacrificing its material advantages. The examples presented herein are merely illustrative embodiments.

What is claimed is:

1. The compound of the formula

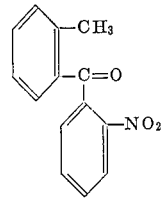

2. The compound of the formula

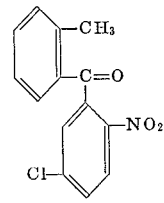

3. The compound of the formula

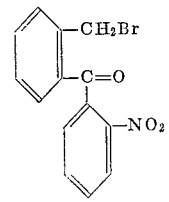

4. The compound of the formula

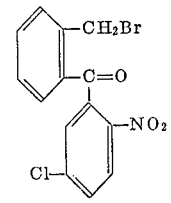

References Cited

Maruyama et al., Chemical Abstracts, 63, 12542a (1965).

Pagliarini et al., Chemical Abstracts, 64, 17569f (1966).

Citing Pagliarini et al., Farmaco, Pavia) Ed. Sci. 20, (10) 686–695 (1965).

Graf et al., Chemical Abs, 54, 404e (1960).

Boetius, Chemical Abs. 30, 457 (1936).

DANIEL D. HORWITZ, Primary Examiner

U.S. Cl. X.R.

260—239.3, 326.1, 471, 618; 424—244